United States Patent
Aljuaydi et al.

(10) Patent No.: US 12,442,454 B2
(45) Date of Patent: Oct. 14, 2025

(54) FLOW CONTROL IN PIPELINES

(71) Applicant: Saudi Arabian Oil Company, Dhahran (SA)

(72) Inventors: Haitham Aljuaydi, Kharj (SA); Mustafa Kidwai, Dhahran (SA); Mohammed Ahmed Kaki, Jeddah (SA)

(73) Assignee: Saudi Arabian Oil Company, Dhahran (SA)

( * ) Notice: Subject to any disclaimer, the term of this patent is extended or adjusted under 35 U.S.C. 154(b) by 90 days.

(21) Appl. No.: 18/373,952

(22) Filed: Sep. 27, 2023

(65) Prior Publication Data

US 2025/0103067 A1   Mar. 27, 2025

(51) Int. Cl.
*F16K 7/07* (2006.01)

(52) U.S. Cl.
CPC ..................... *F16K 7/07* (2013.01)

(58) Field of Classification Search
CPC ............... F16K 7/07; F16K 7/04; F16K 7/02
See application file for complete search history.

(56) References Cited

U.S. PATENT DOCUMENTS

| | | | | |
|---|---|---|---|---|
| 2,241,086 A * | 5/1941 | Gould | ................... | F25B 41/355 62/223 |
| 2,487,226 A * | 11/1949 | Eastman | ................... | F16K 7/07 251/5 |
| 2,590,215 A * | 3/1952 | Sausa | ................... | F16K 7/07 251/5 |
| 2,627,874 A * | 2/1953 | Johnson | ................... | F16K 7/07 251/5 |
| 2,964,285 A * | 12/1960 | Bardet | ................... | F16K 7/07 251/5 |
| 2,972,464 A * | 2/1961 | Jones | ................... | F16K 7/07 251/5 |
| 2,982,511 A * | 5/1961 | Connor | ................... | F16K 7/07 251/5 |
| 3,039,733 A * | 6/1962 | Mattioli | ................... | F16K 7/07 251/5 |
| 3,396,448 A * | 8/1968 | Kisling, III | ................... | F16K 7/07 251/5 |
| 3,441,245 A * | 4/1969 | Barnsley | ................... | F16K 7/07 251/5 |
| 3,485,472 A * | 12/1969 | Bozich | ................... | F16K 7/07 251/5 |
| 3,494,588 A * | 2/1970 | Kisling | ................... | E21B 34/08 251/5 |

(Continued)

FOREIGN PATENT DOCUMENTS

DE      DD-257283 A1 *    6/1988
DE      102017203466 A1 *    9/2018

(Continued)

*Primary Examiner* — David Colon-Morales
(74) *Attorney, Agent, or Firm* — Fish & Richardson P.C.

(57) ABSTRACT

A flow control system includes a conduit having an interior surface, and a flow control device connected to the interior surface of the conduit and disposed along the interior surface of the conduit for a first length. The flow control device includes an expandable element that expands inwardly from the interior surface, from a retracted position to an expanded position. The expandable element defines at least a portion of a flow path configured to control a flow of fluid through the conduit.

20 Claims, 6 Drawing Sheets

(56) References Cited

U.S. PATENT DOCUMENTS

| | | | | |
|---|---|---|---|---|
| 3,552,712 | A * | 1/1971 | Whitlock | F16K 7/07 251/5 |
| 3,604,732 | A * | 9/1971 | Malone | F16L 27/04 220/232 |
| 3,885,769 | A * | 5/1975 | Morrison | F16K 7/07 251/5 |
| 4,092,010 | A * | 5/1978 | Carlson, Jr. | F16K 7/06 138/45 |
| 4,108,418 | A * | 8/1978 | Ensign | F16K 7/07 251/5 |
| 4,111,391 | A * | 9/1978 | Pilolla | F16K 7/07 285/55 |
| 4,135,550 | A * | 1/1979 | Andersson | F16K 7/07 251/5 |
| 4,195,810 | A * | 4/1980 | Lavin | F16K 7/07 251/5 |
| 4,268,005 | A * | 5/1981 | Raftis | F16K 7/07 285/236 |
| 4,303,100 | A * | 12/1981 | Kalb | F16K 7/07 175/218 |
| 4,465,258 | A * | 8/1984 | Weingarten | F16K 7/07 251/5 |
| 4,630,635 | A * | 12/1986 | Bernstein | F16K 7/07 137/315.07 |
| 4,709,900 | A * | 12/1987 | Dyhr | F16K 7/04 251/63.4 |
| 4,785,841 | A * | 11/1988 | Breckner | F16K 25/02 251/5 |
| 5,205,325 | A * | 4/1993 | Piper | E21B 21/10 137/844 |
| 5,316,261 | A * | 5/1994 | Stoner | G01F 1/42 251/129.08 |
| 5,423,225 | A * | 6/1995 | Cage | G01F 1/8463 73/861.357 |
| 5,535,983 | A * | 7/1996 | Hohermuth | F16K 7/07 251/5 |
| 5,753,827 | A * | 5/1998 | Cage | G01F 15/022 73/861.357 |
| 5,814,739 | A * | 9/1998 | Van Cleve | G01F 1/849 73/861.357 |
| 6,102,361 | A * | 8/2000 | Riikonen | F16K 7/07 251/5 |
| 6,431,275 | B1 | 8/2002 | Turley | |
| 7,118,086 | B1 * | 10/2006 | Borglum | F16K 7/07 251/30.01 |
| 7,559,373 | B2 * | 7/2009 | Jackson | E21B 43/006 166/308.1 |
| 7,891,589 | B2 * | 2/2011 | Reichler | B05B 5/1625 239/690 |
| 8,894,069 | B2 | 11/2014 | Xu et al. | |
| 8,985,155 | B2 * | 3/2015 | Loschitz | F16L 55/02754 138/45 |
| 9,127,799 | B2 * | 9/2015 | Brinkmann | F16L 55/027 |
| 9,163,487 | B2 | 10/2015 | Leighton et al. | |
| 9,708,880 | B2 | 7/2017 | Solhaug et al. | |
| 10,138,705 | B2 * | 11/2018 | Oag | E21B 29/08 |
| 10,975,973 | B2 * | 4/2021 | Nakamura | F16K 7/07 |
| 10,996,092 | B2 * | 5/2021 | Keeney-Ritchie | G01F 1/8409 |
| 11,344,902 | B2 * | 5/2022 | Seitz | B05B 7/1477 |
| 11,402,302 | B2 * | 8/2022 | Willich | G01N 1/24 |
| 12,005,593 | B2 * | 6/2024 | Gao | F16K 99/0015 |
| 2008/0105839 | A1 * | 5/2008 | Jennings | F16K 7/07 251/366 |
| 2015/0267822 | A1 * | 9/2015 | Nissen | F16K 31/126 251/5 |
| 2018/0299342 | A1 * | 10/2018 | Hornung | F16K 7/07 |
| 2022/0056786 | A1 * | 2/2022 | AlSayed | E21B 41/0078 |

FOREIGN PATENT DOCUMENTS

| | | | | |
|---|---|---|---|---|
| DE | 102017223242 A1 * | 6/2019 | | F16K 37/0041 |
| GB | 620173 A * | 3/1949 | | |
| GB | 2181214 A * | 4/1987 | | F16K 7/07 |
| WO | WO 02002309 | 1/2002 | | |

* cited by examiner

directing, with a flow control device positioned within a conduit, a fluid along a flowpath defined at least partially by the flow control device, the flow control device being connected to an interior surface of the conduit and extending along the interior surface of the conduit for a first length — 802 actuating an expandable element of the flow control device within the conduit, the expandable element configured to move between a retracted position and an expanded position of the flow control device, wherein the expandable element is configured to expand inwardly from the interior surface from the retracted position to the expanded position — 804

FIG. 8

FLOW CONTROL IN PIPELINES

TECHNICAL FIELD

This disclosure relates to flow control devices in fluid conduits.

BACKGROUND

Hydrocarbon wells are used to access and extract hydrocarbons from subterranean reservoirs. The hydrocarbons produced from these reservoirs are transported from the well through pipelines to surface facilities, such as processing facilities and plants. The length of these pipelines can be miles long, such as hundreds of miles long, and are prone to corrosion.

SUMMARY

This disclosure describes flow control systems for guiding fluid along a flowpath through a fluid conduit.

In some aspects, a flow control system includes a conduit having an interior surface, and a flow control device connected to the interior surface of the conduit and disposed along the interior surface of the conduit for a first length. The flow control device includes an expandable element that expands inwardly from the interior surface, from a retracted position to an expanded position. The expandable element defines at least a portion of a flow path to control a flow of fluid through the conduit. In some instances, the expandable element includes an inflatable bladder.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 8 is a flowchart describing an example method for flowing fluid in a conduit.

Like reference numbers and designations in the various drawings indicate like elements.

DETAILED DESCRIPTION

Figure 1:
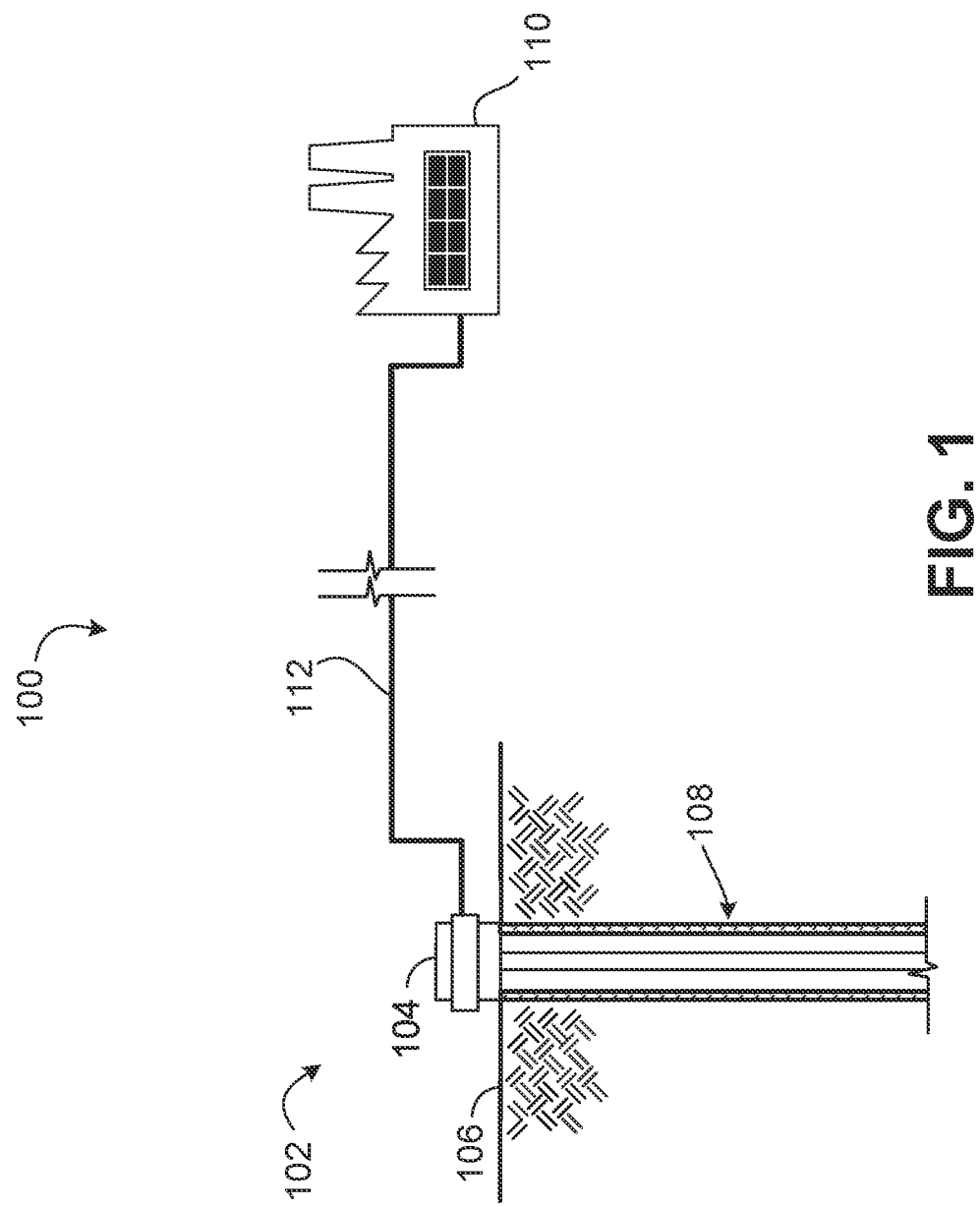
FIG. 1 is a schematic, partial cross-sectional view of an example fluid transportation system between a well system and a processing facility.

This disclosure describes flow control devices in fluid conduits, such as in transportation pipelines for transporting hydrocarbons from a wellhead to processing facilities or plants. A conduit section includes one or more flow control devices within the interior space of the pipeline section that can vary the available space for fluid to flow through the pipeline section over a length of the pipeline section. In some instances, a flow control device includes an inflatable element positioned within a pipeline section, and the inflatable element can be inflated to reduce a cross-sectional flow area of a fluid flowing through the pipeline section. In some examples, the pipeline section is cylindrical and rigid, and the inflatable element is cylindrical having an inner surface and an outer surface, and inflating the cylindrical inflatable element moves the inner surface radially inward from the pipeline wall to effectively reduce an internal diameter of the pipeline section, for example, to increase a flow velocity of the fluid flow through the pipeline section. This increase in flow velocity due to a reduction in cross-sectional area is based on the Bernoulli principle, where an increase in the flow velocity of a fluid occurs simultaneously with a reduction in the cross-sectional area of the fluid flow. For example, one or more inflatable cylindrical elements can line all or a portion of an interior surface of the pipeline section, and the inflatable element(s) can be controlled to inflate or deflate in order to provide a desired cross-sectional area of the flowpath for fluid flowing through the pipeline section. In some instances, the inflatable elements are installed in the pipeline section in a deflated state within the flowpath of fluid through the pipeline section, and the inflatable elements are inflated to move radially inward a predetermined amount to reduce the diametral area of the flowpath in order to increase a flow velocity of the fluid through the pipeline section. The inflatable elements can further be deflated to increase the diametral area of the flowpath and decrease a flow velocity of the fluid through the pipeline section.

Hydrocarbons produced from subterranean wells are transported to surface facilities through one or more pipelines. The length of these pipelines can vary in total length, and can span hundreds of miles in length. These pipelines are prone to corrosion due to stagnant fluid flow, the presence of water in the fluid, or both. In some hydrocarbon wells, production flow is accelerated with a water-driven strategy to stimulate production of the well, which introduces a larger component of water to the fluid that reaches and flows through the pipeline. However, a water drive strategy introduces substantial amounts of water to the fluid that can accelerate the corrosion rate of the pipeline, and pipeline corrosion is exacerbated during low production periods where the water begins to stagnate and settle around the boundaries of the flowlines of the pipeline. This stagnation gradually corrodes the surrounding area of the pipeline, and over time, the severity of the corrosion can increase to levels that require complete shutdown of production to allow for the replacement of the damaged pipeline. Replacement operations can take multiple days, which would harm the overall production rate. In the present disclosure, the flow velocity of the fluid through the pipeline can be increased by reducing the internal cross-sectional area of the pipeline available for fluid flow. For example, fluid flow stagnation in a pipeline can be avoided or reduced by inflating flow control devices in the pipeline to decrease the internal cross-sectional area of the pipeline. This decrease in cross-sectional area increases the flow velocity through the reduced-area portion of the pipeline. The flow control devices of the present disclosure can increase the flow velocity of fluid through a pipeline and reduce the risk of corrosion through the pipeline. The flow control devices can include inflatable elements that line an interior surface of the pipeline along all or a portion of the length of the pipeline. In some instances, the inflatable elements are hydraulically actuated, and controlled remotely.

FIG. 1 is a schematic, partial cross-sectional view of an example fluid transportation system 100 between a well system 102 and a processing facility 110. The well system 102 includes a wellbore 108 that extends from a well head 104 at a surface 106 of the well system 102 downward into the Earth, such as into a subterranean zone of interest. The example well system 102 includes a vertical well, with the wellbore 108 extending substantially vertically from the surface 106 into the Earth. The concepts herein, however, are applicable to many other different configurations of wells, such as horizontal, slanted, or otherwise deviated wells. The well system 102 is depicted as a production well, where a production fluid received from the wellbore 108 at the well head 104 is directed from the well head 104 through a pipeline 112 connected to the well head 104. The production fluid is further directed through the pipeline 112 to a facility 110 at a downstream location away from the well head 104. The facility 110 is depicted as a downstream processing plant, where the production fluid can be processed or refined before further transportation. The facility 110 can take other forms though, such as a refinery, transportation facility, or other destination that receives the production fluid.

The pipeline 112 is a fluid conduit for communicating the fluid between the well system 102 and the facility 110. In some implementations, the pipeline 112 is a cylindrical conduit with an inner surface and an outer surface, where the inner surface defines a circular cross-sectional area. However, shape and cross-sectional area of the pipeline 112 can vary. The pipeline 112 can have the same circular flow area across its entire length, or can include multiple conduit sections with the same or different flow areas across all or a portion of the length of the pipeline 112. In operation, the fluid flow through the pipeline 112 may experience fluctuating pressures, varying flow velocities, or other variances in a fluid characteristic of the fluid while the fluid flow traverses a distance along the pipeline 112. For example, production from the well system 102 can fluctuate over the life of the well, and can experience low production periods where the flow of production fluid from the well head 104 into the pipeline 112 experiences a reduction in flow rate, fluid pressure, or a combination of these. The pipeline 112 of the example transportation system 100 includes a flow control system (not shown, described later) to control the flow of fluid through the pipeline 112. For example, the flow control system can boost a flow rate of the fluid through the pipeline 112 by actively reducing a cross-sectional flow area of the flowpath through a partial length or an entire length of the pipeline 112. The flow control system can be installed along the entire length or a portion of the entire length of the pipeline 112 to control the fluid flow along all or a portion of the pipeline 112.

The example transportation system 100 is depicted as extending between the well system 102 and the facility 110 to guide and control fluid between the well system 102 and the facility 110. However, the pipeline 112 and associated flow control system can be disposed between other facilities or systems, or implemented in other technologies that incorporate fluid flow through a pipeline over a range of distances. For example, the pipeline 112 can be positioned between two processing facilities or other surface facilities to control fluid flow between the facilities, between two separate well systems to control hydrocarbon fluid flow, water fluid flow, or both hydrocarbons and water between the well systems, or between any other two destinations that are fluidly connected by a pipeline or other fluid conduit for communicating fluid.

Figure 2:
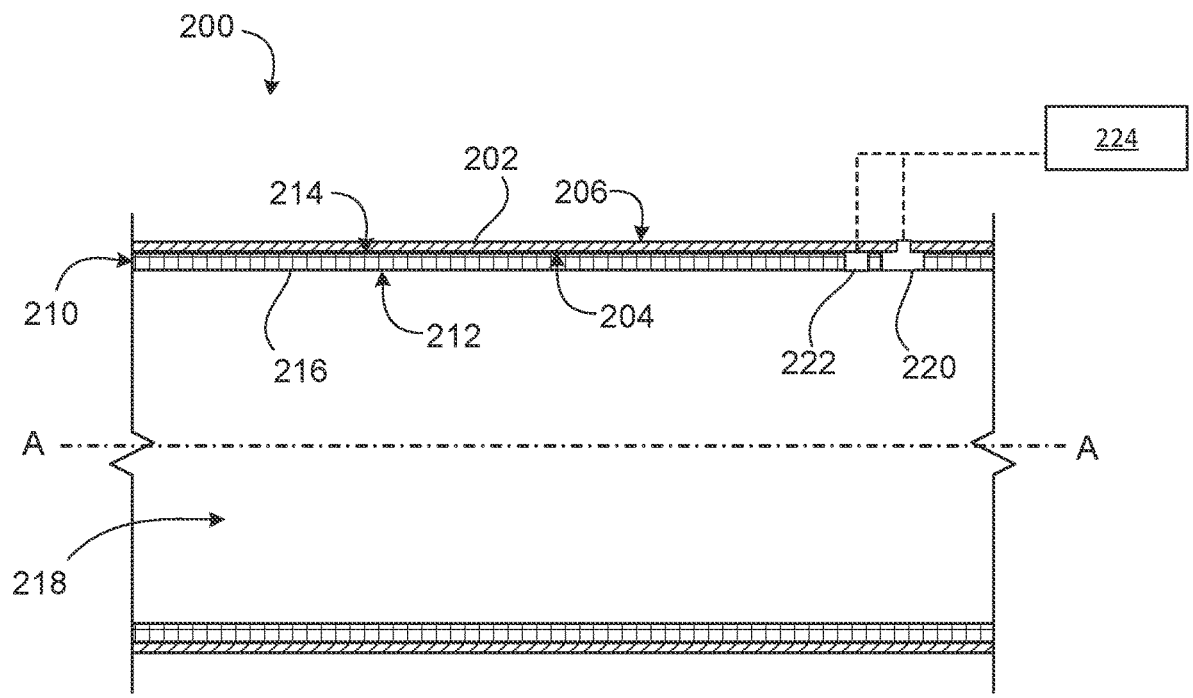
FIG. 2 is a partial cross-sectional side view of an example flow control system in a retracted position that can be used in the fluid transportation system of FIG. 1.

FIG. 2 is a partial cross-sectional side view of an example flow control system 200 that can be used in the pipeline 112 of the example fluid transportation system 100 of FIG. 1. For example, the example flow control system 200 can be implemented along the entire length or a partial length section of the pipeline 112. In some examples, more than one flow control system 200 can be implemented in the pipeline 112, for example, in series along all or a portion of the length of the pipeline 112.

The example flow control system 200 includes a conduit 202, such as a section of a fluid conduit, arranged along a longitudinal axis A-A. The conduit 202 includes an interior surface 204 and an exterior surface 206, and extends along the axis A-A for a first length. The conduit 202 of the example flow control system 200 is formed of a rigid material, such as iron, steel, or other metal. However, the material making up the conduit 202 can vary, and can include plastics including polyvinyl chloride (PVC) or other rigid plastics. In some examples, the material of the conduit 202 is selected at least partially based on an ambient environment that the conduit 202 is positioned within, and can vary based on climate or anticipated weather at the location(s) of the conduit 202. In certain examples, the material of the conduit 202 is selected at least in part based on the type of fluid flowing through the conduit 202. The example flow control system 200 also includes a flow control device 210 connected to the interior surface 204 of the conduit 202, and is disposed along the interior surface 204 for the first length. The flow control device 210 includes an inner surface 212 and an outer surface 214, and the outer surface 214 of the flow control device 210 can connect to the interior surface 204 of the conduit 202 with adhesive, one or more fasteners, with a friction fit, a combination of these, or otherwise connected to the conduit 202 to position the flow control device 210 within the conduit 202 and, in some instances, fixed with respect to the axis A-A. The example flow control system 200 is shown as unbounded on the longitudinal ends of the conduit 202 relative to the longitudinal axis A-A, however, the conduit 202, flow control device 210, or both, extends for the first length, which can be any length. At the longitudinal ends of the example flow control system 200, the conduit 202 can connect to another conduit section, a facility, a well head, or any other structure fit to fluidly connect to the conduit 202 and receive a fluid flow from the conduit 202 or deliver a fluid flow to the conduit 202. Similarly, the flow control device 210 can connect to or abut another flow control device at one or both of its longitudinal ends.

Figure 4:
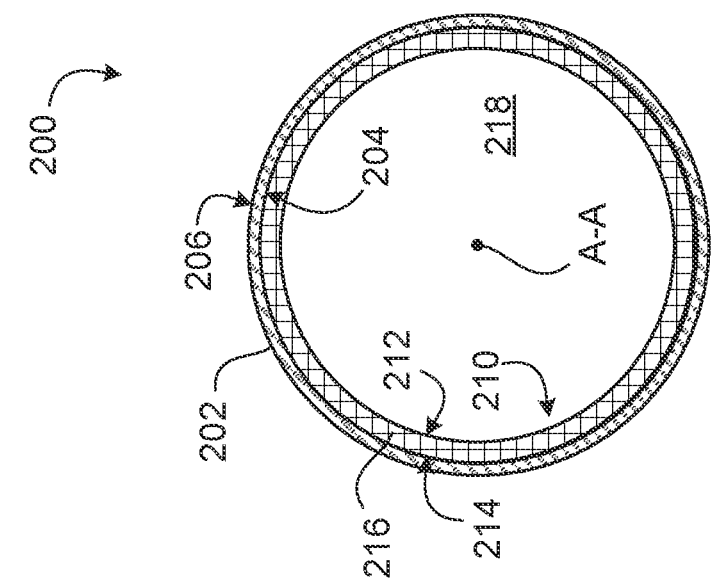
FIG. 4 is a cross-sectional front view of the example flow control system of FIG. 2.

In the example flow control system 200, the conduit 202 and the flow control device 210 have an annular shape, or hollow cylindrical shape, that allows for fluid flow within the interior surface 204 of the conduit 202 and within the inner surface 212 of the flow control device 210. FIG. 4 is a cross-sectional front view of the example flow control system 200 of FIG. 2. The example flow control system 200 is arranged around the central axis A-A, such that the inner surface 212 of the flow control device 210 is a radial surface with a smaller diameter than that of the outer surface 214. The diameter of the outer surface 214 can be the same or just less than the diameter of the interior surface 204 of the conduit 202 for positioning the flow control device 210 radially within the conduit 202.

Figure 3:
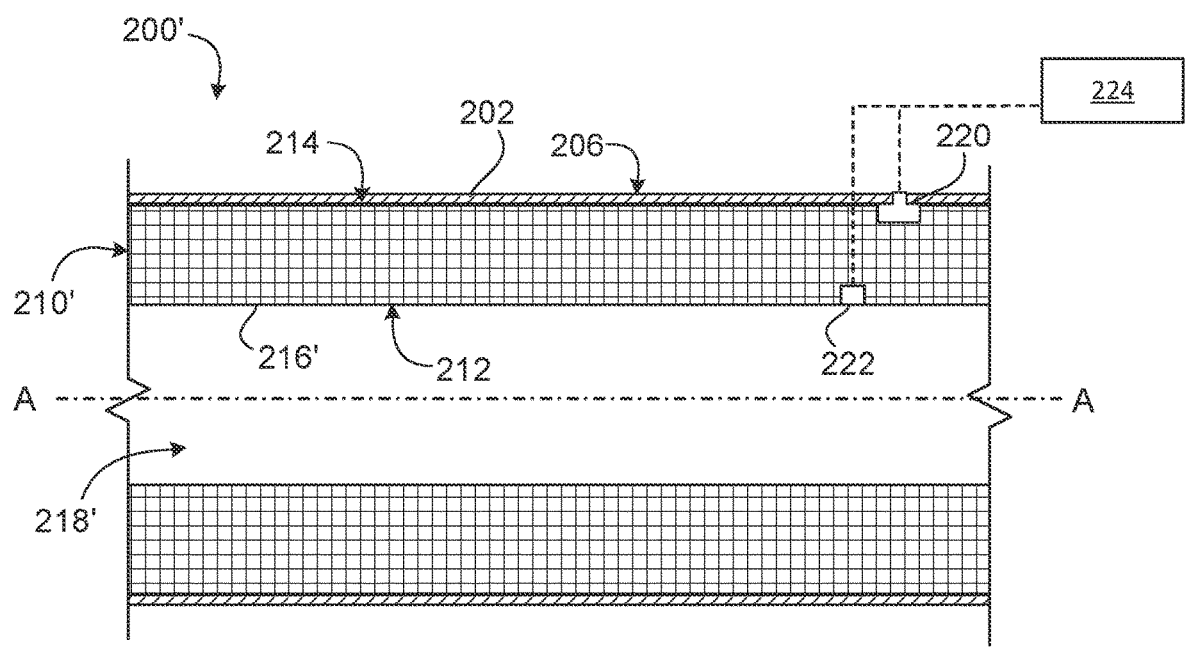
FIG. 3 is a partial cross-sectional side view of the example flow control system of FIG. 2, with the example flow control system in an expanded position.
Figure 5:
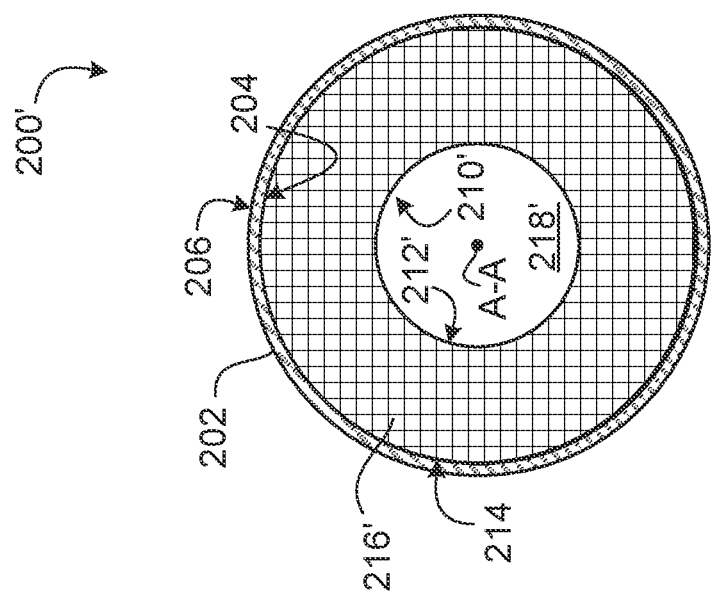
FIG. 5 is a cross-sectional front view of the example flow control system of FIG. 3.

The flow control device 210 includes an expandable element 216 that can be controlled to expand, for example, radially inwardly from the interior surface 204 toward axis A-A. In the example flow control system 200, the expandable element 216 includes an inflatable bladder, such as a fluid bladder or air bladder. However, the expandable element 216 can take other forms, such as a swellable material, or bladder that is expandable hydraulically or through fluid filling. In some examples, the expandable element is an inflatable packer with a fluid bladder that acts to expand the inflatable packer when the fluid bladder is filled with a fluid and acts to retract the inflatable packer when flid is removed from the fluid bladder. In the example flow control system 200 of FIGS. 2 and 4, the flow control device 210 is shown in a retracted position, where a thickness of the flow control device 210 between the inner surface 212 and outer surface 214 is small. FIGS. 3 and 5 are a partial cross-sectional side view and a cross-sectional front view, respectively, of the example flow control system 200' with the expandable element 216' of the flow control device 210' shown in an expanded position, where a thickness of the flow control device 210' between the inner surface 212 and outer surface 214 is greater than the thickness in the retracted position. In the expanded position of the flow control device 210', the inner surface 212 is positioned more radially inward than the inner surface 212 of the flow control device 210 in the retracted position.

In operation, a fluid flows through the flow control system 200, 200' along a flowpath 218 defined partially or completely by the inner surface 212 of the flow control device 210, 210'. For example, in the example flow control system 200 of FIG. 4, with the flow control device 210 in the retracted position, the flowpath 218 is defined by the inner surface 212, and the flowpath 218 has a first flow area defined by the circle formed by the inner surface 212. In the example flow control system 200' of FIG. 5, with the flow control device 210 in the expanded position, the flowpath 218' is defined by the inner surface 212, and the flowpath 218' has a second flow area defined by the relatively smaller circle formed by the inner surface 212. The second flow area is smaller than the first flow area. This reduction in flow area from the first flow area to the second flow area of the flowpath 218' can affect the fluid flow along the flowpath 218' to move at a faster flow rate than the fluid flow along the flowpath 218 in the retracted position.

Controlling the expandable element 216, 216' of the flow control device 210 can affect the flow rate of fluid flowing through the flow control system 200, 200' based on the Bernoulli principle. For example, the flow area of the flowpath affects the flow rate along the flowpath, so reducing or increasing the flow area of the flowpath can increase or decrease the flow rate, respectively, of the fluid along the flowpath. For example, per Bernoulli's equation seen in Equations 1 and 2, reducing the cross-sectional flow area of the flowpath 218, 218' increases the velocity of the fluid flow.

$$P_1 + \frac{1}{2}\rho v_1^2 = P_2 + \frac{1}{2}\rho v_2^2 \qquad \text{(Eq. 1)}$$

$$A_1 v_1 = A_2 v_2 \qquad \text{(Eq. 2)}$$

In Equations 1 and 2, P represents pressure of the fluid, p refers to density of the fluid, v is the velocity of the fluid, and A is the area of the flowpath. In operation, an increase in flow velocity, v, can reduce a likelihood of fluid stagnation in the conduit 202, such as around the boundaries of the flowpath 218, 218' through the conduit 202. In some examples, such as after a low production period concludes, the expandable element 216, 216' can be retracted to restore the flowpath to the larger first flow area.

The cross-sectional dimensions of the conduit 202, the expandable element 216, or both, can vary across an entirety or a partial length of the conduit 202. In some implementations, the conduit 202 is a fluid pipeline with an internal diameter between 6 inches and 12 inches, such as an 8 inch diameter pipeline. The expandable element 216 residing within the pipeline in contact with the interior surface 204 can include a thickness in the retracted position of 1 inch or less, in that the thickness dimension between the inner surface 212 and the outer surface 214 is 1 inch or less. In some examples, the thickness can be 0.5 inch, 1 inch, or another dimension between 0.1 inch and 1 inch. The resultant flowpath 218 for fluid flow, defined by the inner surface 212 of the expandable element 216, would have the first flow area with a first diameter between 6 inches and 8 inches. In the expanded position of the expandable element 216', such as a fully expanded position of the expandable element 216', the thickness between the inner surface 212 and the outer surface 214 is three inches or greater. In the expanded position of the expandable element 216', the resultant flowpath 218' would have the second flow area with a second diameter of 2 inches or greater. The flow control device 210, 210' can be controlled to an intermediate position between the fully retracted position of FIG. 2 and the fully expanded position of FIG. 3, and the resultant flowpath can have a third flow area with a diameter between the first diameter and the second diameter, such as a third flow area with a diameter between three inches and seven inches.

In certain implementation, the flow control device 210, 210' moves between the retracted position, the expanded position, or an intermediate position between the retracted position and the expanded position, and is controlled to take up a percentage of space of the flow area defined by the interior surface 204 of the conduit 202. For example, in the retracted position, the flow control device 210 takes up 25% or less of the cross-sectional flow area defined by the interior surface 204 of the conduit 202, such as 20%, 15%, 10%, 5% or another percentage less than 25%. In the expanded position, the flow control device 210' takes up about 50% or more of the cross-sectional flow area defined by the interior surface 204 of the conduit 202, such as 60%, 75%, 85% or another percentage.

In the example flow control system 200, 200' of FIGS. 2-5, the conduit 202 includes a hollow cylinder, the expandable element 216, 216' of the flow control device 210, 210' has an annular shape disposed along ang against the interior surface 204 of the conduit 202, and the resultant flowpath 218, 218' is a cylindrical flowpath through the conduit 202 and the flow control device 210, 210'. However, the shape of the conduit 202, the shape of the expandable element, and the shape of the resultant flowpath can vary. In some instances, the conduit 202 can take a non-cylindrical shape, such as a fluid conduit with an oblong cross-section, rectangular cross-section, or other shape. The expandable element can take on other shapes to match all or a portion of the interior surface of the conduit 202. In some examples, the expandable element is disposed along just a portion of the inner surface of the conduit, such as along just a bottom half of the interior surface of the conduit. For example, the expandable element can have a partial- or semi-circular shape, and can expand to take up all or a portion of a bottom half of the interior cross-sectional area of the conduit.

The flow control system 200, 200' includes an actuator 220 operatively connected to the expandable element 216, 216' of the flow control device 210, 210' to drive the inward expansion of the expandable element 216, 216'. The actuator 220 controls the expansion, retraction, or both expansion and retraction of the expandable element 216, 216'. For example, the actuator 220 controls the flow control device 210, 210' to expand or retract the expandable element 216, 216' to the retracted position, the expanded position, or an intermediate position between the retracted position and the expanded position.

The actuator 220 can drive the expandable element 216, 216' hydraulically, mechanically, or another way. In the actuator 220 of the example flow control system 200, the actuator 220 is a hydraulic actuator that drives a fluid within or into contact with the expandable element 216, 216' to inflate, swell, or otherwise cause expansion of the expandable element 216, 216'. For example, the actuator 220 can extend partially through the conduit 202 and be fluidly connected to an exterior fluid source, such as ambient air surrounding the conduit 202, a separate hydraulic fluid source, or another fluid source, which fluidly connects to the actuator 220 and aids the operation of the actuator 220 to drive movement of the expandable element 216. The actuator 220 can take other forms.

In some implementations, the actuator 220 is a hydraulic actuator and the expandable element is an inflatable bladder, and the actuator 220 drives the expansion and retraction of the inflatable bladder by pumping fluid into or extracting fluid from the inflatable bladder. The pressure, volume, or both pressure and volume of fluid can be controlled by the actuator 220 to provide a desired amount of expansion or retraction. The hydraulic actuator can actively control the degree of expansion or retraction of the inflatable bladder, for example, to effect a desired flow area of the flowpath, for example, to provide a desired flow rate of the fluid flow through the example flow control system 200, 200'.

The example flow control system 200, 200' also includes a sensor 222 and a communication system 224 communicably connected to the sensor 222 and the actuator 220. In some implementations, the communication system 224 controls the actuator 220 to actuate the expandable element 216, 216'. The sensor 222 senses a characteristic of the fluid in the flowpath 218, 218', and communicates with the communication system 224 to provide a signal based on the sensed fluid characteristic. The sensor 222 of the example flow control system 200, 200' is positioned within the flow control device 210, 210', such as directly adjacent to the flowpath 218, 218'. In this position, the sensor 222 can directly contact or directly sense the fluid in the flowpath 218, 218'. The sensor 222 can include one or more sensor components, such as a flow rate sensor, water content sensor, distance sensor (such as an ultrasonic sensor), a combination of these, or another sensor type. The sensor 222 can determine a flow rate of the fluid flow, a dimension of the flowpath, a water content of the fluid, or another characteristic of the fluid flow in the example flow control system 200, 200'.

The communication system 224 can communicate with the sensor 222 and the actuator 220 to control the flow control device 210, 210' and position the expandable element 216, 216' of the flow control device 210, 210' to a desired position, such as the retracted position, the expanded position, or an intermediate position between the retracted position and the expanded position. The communication system 224 can connect to the actuator 220, sensor 222, or both, wirelessly or with a wired connection. In some instances, the communication system 224 receives a signal from the sensor 222 and actuates the actuator 220 to expand or retract a certain degree based on the signal from the sensor 222. For example, the sensor 222 can sense a flow rate of the fluid flow in the flowpath and send a signal to the communication system 224 based on that sensed characteristic, and the communication system 224 can compare the sensed flow rate to a minimum flow rate threshold, a maximum flow rate threshold, or both. In instances where the sensed flow rate is below the minimum flow rate threshold, the communication system 224 can send a signal to the actuator 220 to expand the expandable element 216, 216'. In instances where the sensed flow rate is above the maximum flow rate threshold, the communication system 24 can send a signal to the actuator 220 to retract the expandable element 216, 216'.

Figure 6:
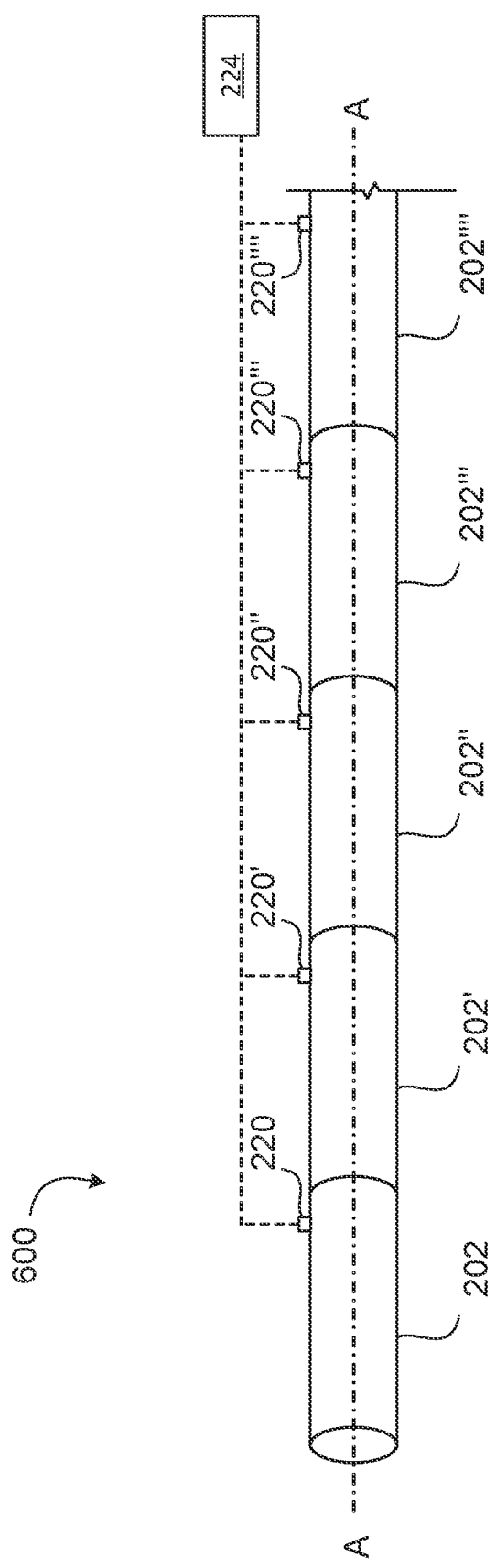
FIG. 6 is a schematic front view of a second example flow control system that includes the features of the example flow control system of FIG. 2.

The communication system 224 can communicate with and control more than one actuator and more than one sensor of more than one flow control device. For example, multiple flow control systems can be aligned along the axis A-A and integrate with each other to provide a controllable flow area of a flowpath along a length of a pipeline. FIG. 6 is a schematic front view of a second example flow control system 600 that incorporates multiple lengths of conduit 202 with multiple flow control devices disposed within the conduits 202 that form a single flowpath through the multiple lengths of conduit. The conduit 202 is the same as the conduit 202 of the example flow control system 200 of FIGS. 2-5, but the conduit 202 is connected to additional similar conduits at its longitudinal ends along axis A-A. The second example flow control system 600 includes the conduit 202, a second conduit 202', a third conduit 202", a fourth conduit 202''' and a fifth conduit 202'''', each having a respective actuator 220, 220', 220", 220''', 220''''. Each of the actuators communicate with the communication system. 224, and the communication system 224 can control the actuators independently or collectively to provide a respective flow area through each flow control device residing in each of the conduits. Each of the conduit sections can include a sensor (like the sensor 222 of example flow control system 200) that is communicably connected to the communication system 224, and the communication system 224 can receive signals from one or more or all of the sensors to control the multiple actuators individually or collectively based on the signal(s) from the sensor(s).

Figure 7:
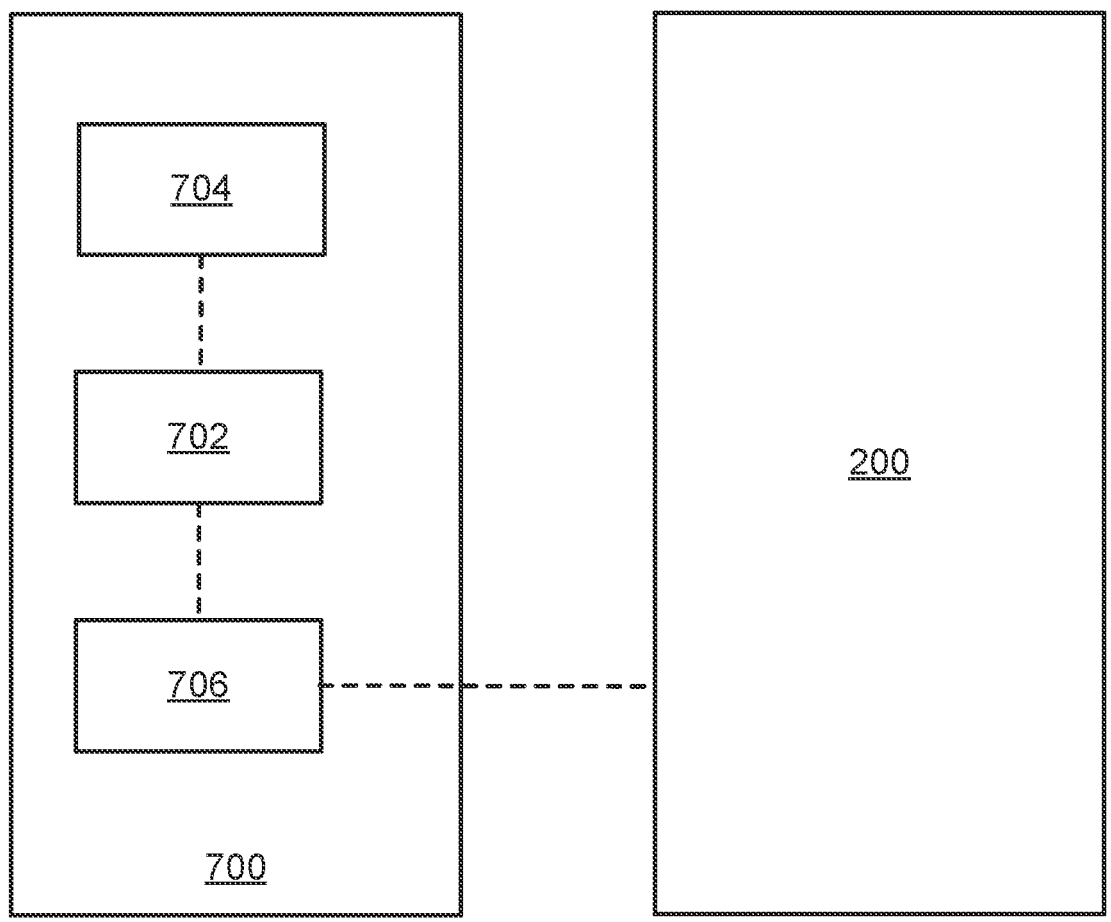
FIG. 7 is a block diagram of an example controller that can be used in the example flow control systems of FIGS. 2-6.

FIG. 7 is a block diagram of a controller 700 that can be used with aspects of the communication system 224 of the example flow control system 200 of FIG. 2 or the second example flow control system 600 of FIG. 6. The controller 700 can include one or more processors 702 and non-transitory memory 704 including instructions to facilitate sending and receiving signals through an input/output (I/O) interface 706. The controller 700 can communicate with components of the example flow control system 200 such as, for example, the sensor 222, actuator 220, both of these, or other components of the example flow control system 200. In some implementations, the controller 700 is located at or near the conduit 202 of the example flow control system 200, remotely at the wellhead of a production well, remotely at a surface facility (such as a processing plant), at a combination of these locations, or elsewhere. For example, the controller 700 can be a distributed controller, where a portion of the controller 700 is located within or local to the example flow control system 200, while another portion of the controller 700 is located elsewhere at a remote location, such as at the wellhead or topside facility along the pipeline formed by the conduit 202. The controller 700 operates to receive, assess, and transmit data, such as receive one or more signals from the sensor 222, interpret and compare the received signal to stored data, and communicate instructions to the actuator 220 to perform an operation.

FIG. 8 is a flowchart describing an example method 800 for flowing fluid in a conduit, for example, performed by the example flow control system 200 of FIGS. 2-5 or the second example flow control system 600 of FIG. 6. At 802, a flow control device positioned within a conduit directs a fluid along a flowpath defined at least partially by the flow control device. The flow control device is connected to an interior surface of the conduit and extends along the interior surface of the conduit for a first length. At 804, an expandable element of the flow control device is expanded within the conduit. The expandable element moves between a retracted position and an expanded position of the flow control device, and the expandable element expands inwardly from the interior surface from the retracted position to the expanded position. Actuating the expandable element can include expanding the expandable element from the retracted position to the expanded position within the conduit, or retracting the expandable element from the expanded position to the retracted position. In some instances, actuating the expandable element includes adjusting the flowpath from a first flow area along the expandable element to a second, different flow area along the expandable element. For example, the expandable element can include an inner surface and an outer surface and have a hollow cylindrical shape, actuating the expandable element can include expanding the inner surface of the expandable element radially inwardly from the interior surface of the conduit from the retracted position to the expanded position, and the first flow area includes a first circular area defining a first diameter and the second flow area includes a second circular area defining a second, smaller diameter. Actuating the expandable element of the flow control device within the conduit can include driving the expandable element from the retracted position to the expanded position with an actuator. The actuator can include a hydraulic actuator, where the expandable element is an inflatable bladder. In some implementations, a sensor senses a characteristic of the fluid in the flowpath, and a communication system receives a signal from the sensor, where actuation of the expandable element is based on the received signal from the sensor.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. Various modifications may be made without departing from the spirit and scope of the disclosure. In some cases, the actions recited in the claims can be performed in a different order and still achieve desirable results. In addition, the processes depicted in the accompanying figures do not necessarily require the particular order shown, or sequential order, to achieve desirable results.

EXAMPLES

In a first aspect, a flow control system comprises a conduit comprising an interior surface, and a flow control device connected to the interior surface of the conduit and disposed along the interior surface of the conduit for a first length, the flow control device comprising an expandable element configured to expand inwardly from the interior surface from a retracted position to an expanded position, the expandable element defining at least a portion of a flow path configured to control a flow of fluid through the conduit.

In a second aspect according to the first aspect, wherein in the retracted position of the expandable element, the expandable element defines the flow path having a first flow area along the expandable element, and in the expanded position of the expandable element, the expandable element defines the flow path having a second flow area along the expandable element, the second flow area being smaller than the first flow area.

In a third aspect according to the second aspect, the expandable element comprises an outer surface and an inner surface and having a hollow cylindrical shape, the inner surface of the expandable element is configured to expand radially inwardly from the interior surface of the conduit from the retracted position to the expanded position of the expandable element, and the first flow area comprises a first circular area defining a first diameter and the second flow area comprises a second circular area defining a second, smaller diameter.

In a fourth aspect according to any one of the first aspect to the third aspect, the expandable element is coupled directly to the interior surface of the conduit.

In a fifth aspect according to any one of the first aspect to the fourth aspect, the flow control device further comprises an actuator connected to the expandable element, the actuator configured to drive the inward expansion of the expandable element.

In a sixth aspect according to the fifth aspect, the actuator comprises a hydraulic actuator.

In a seventh aspect according to the fifth aspect or the sixth aspect, the flow control system further comprises a communication system communicably connected to the actuator, the communication system configured to control the actuator to actuate the expandable element.

In an eighth aspect according to the seventh aspect, the flow control system further comprises at least one sensor configured to sense a characteristic of the fluid in the flow path, and the communication system configured to control the actuator in response to a signal from the at least one sensor.

In a ninth aspect according to any one of the first aspect to the eighth aspect, the expandable element comprises an inflatable bladder, the inflatable bladder configured to inflate from the retracted position to the expanded position.

In a tenth aspect according to any one of the first aspect to the ninth aspect, the first length comprises an entire longitudinal length of the conduit.

In an eleventh aspect according to any one of the first aspect to the tenth aspect, the conduit comprises a pipeline extending at least partially between a well head of a hydrocarbon production well and a surface facility.

In a twelfth aspect, a method for flowing fluid in a conduit comprises directing, with a flow control device positioned within a conduit, a fluid along a flow path defined at least partially by the flow control device, the flow control device being connected to an interior surface of the conduit and extending along the interior surface of the conduit for a first length, and actuating an expandable element of the flow control device within the conduit, the expandable element configured to move between a retracted position and an expanded position of the flow control device, wherein the expandable element is configured to expand inwardly from the interior surface from the retracted position to the expanded position.

In a thirteenth aspect according to the twelfth aspect, actuating the expandable element comprises expanding the expandable element from the retracted position to the expanded position within the conduit.

In a fourteenth aspect according to the twelfth aspect or the thirteenth aspect, actuating the expandable element comprises adjusting the flowpath from a first flow area along the expandable element to a second, different flow area along the expandable element.

In a fifteenth aspect according to the fourteenth aspect, the expandable element comprises an inner surface and an outer surface and comprises a hollow cylindrical shape, actuating the expandable element comprises expanding the inner surface of the expandable element radially inwardly from the interior surface of the conduit from the retracted position to the expanded position, and the first flow area comprises a first circular area defining a first diameter and the second flow area comprises a second circular area defining a second, smaller diameter.

In a sixteenth aspect according to any one of the twelfth aspect to the fifteenth aspect, actuating the expandable element of the flow control device within the conduit comprises driving, with an actuator, the expandable element from the retracted position to the expanded position.

In a seventeenth aspect according to any one of the twelfth aspect to the sixteenth aspect, actuating the expandable element of the flow control device comprises inflating an inflatable bladder of the flow control device within the conduit.

In an eighteenth aspect according to any one of the twelfth aspect to the seventeenth aspect, the method further comprises sensing, with at least one sensor, a characteristic of the fluid in the flowpath, and receiving, at a communication system, a signal from the at least one sensor, wherein the actuating of the expandable element occurs based on the received signal from the at least one sensor.

In a nineteenth aspect, a flow control device comprises an inflatable bladder connected to an interior surface of a conduit and disposed along the interior surface of the conduit for a first length, the inflatable bladder configured to expand inwardly from the interior surface from a first, retracted position to a second, expanded position, and an inner surface of the inflatable bladder defining at least a portion of a flowpath configured to guide a fluid through the conduit.

In a twentieth aspect according to the nineteenth aspect, the inflatable bladder comprises a hollow cylindrical shape, and the inner surface of the inflatable bladder defines the flowpath having a circular flow area along the inner surface of the inflatable bladder.

What is claimed is:

1. A flow control system, comprising:
   a conduit comprising an interior surface; and
   a flow control device connected to the interior surface of the conduit and disposed along the interior surface of the conduit for a first length, the flow control device comprising an expandable element comprising an outer surface and an inner surface having a hollow cylindrical shape, the expandable element configured to expand inwardly from the interior surface from a retracted position to an expanded position, the expandable element defining at least a portion of a flow path configured to control a flow of fluid through the conduit, wherein, in the expanded position of the flow control device, the inner surface is cylindrical along the first length and defines the at least a portion of the flow path.

2. The flow control system of claim 1, wherein:
   in the retracted position of the expandable element, the expandable element defines the flow path having a first flow area along the expandable element, and
   in the expanded position of the expandable element, the expandable element defines the flow path having a second flow area along the expandable element, the second flow area being smaller than the first flow area.

3. The flow control system of claim 2, wherein:
   the inner surface of the expandable element configured to expand radially inwardly from the interior surface of the conduit from the retracted position to the expanded position of the expandable element, and
   the first flow area comprises a first circular area defining a first diameter and the second flow area comprises a second circular area defining a second, smaller diameter.

4. The flow control system of claim 1, wherein the expandable element is coupled directly to the interior surface of the conduit.

5. The flow control system of claim 1, wherein the flow control device further comprises an actuator connected to the expandable element, the actuator configured to drive the inward expansion of the expandable element.

6. The flow control system of claim 5, wherein the actuator comprises a hydraulic actuator.

7. The flow control system of claim 5, further comprising a communication system communicably connected to the actuator, the communication system configured to control the actuator to actuate the expandable element.

8. The flow control system of claim 7, further comprising at least one sensor configured to sense a characteristic of the fluid in the flow path, and the communication system configured to control the actuator in response to a signal from the at least one sensor.

9. The flow control system of claim 1, wherein the expandable element comprises an inflatable bladder, the inflatable bladder configured to inflate from the retracted position to the expanded position.

10. The flow control system of claim 1, wherein the first length comprises an entire longitudinal length of the conduit.

11. The flow control system of claim 1, wherein the conduit comprises a pipeline extending at least partially between a well head of a hydrocarbon production well and a surface facility, and the first length comprises at least a majority of the length of the pipeline.

12. A method for flowing fluid in a conduit, the method comprising:

directing, with a flow control device positioned within the conduit, the fluid along a flow path defined at least partially by the flow control device, the flow control device being connected to an interior surface of the conduit and extending along the interior surface of the conduit for a first length; and actuating an expandable element of the flow control device within the conduit, the expandable element comprising an outer surface and an inner surface having a hollow cylindrical shape, the expandable element configured to move between a retracted position and an expanded position of the flow control device, wherein the expandable element is configured to expand inwardly from the interior surface from the retracted position to the expanded position, and the inner surface defining a cylindrical flow path along the first length in the expanded position of the expandable element.

13. The method of claim 12, wherein actuating the expandable element comprises expanding the expandable element from the retracted position to the expanded position within the conduit.

14. The method of claim 12, wherein actuating the expandable element comprises adjusting the flow path from a first flow area along the expandable element to a second, different flow area along the expandable element.

15. The method of claim 14, wherein:

actuating the expandable element comprises expanding the inner surface of the expandable element radially inwardly from the interior surface of the conduit from the retracted position to the expanded position, and the first flow area comprises a first circular area defining a first diameter and the second flow area comprises a second circular area defining a second, smaller diameter.

16. The method of claim 12, wherein actuating the expandable element of the flow control device within the conduit comprises driving, with an actuator, the expandable element from the retracted position to the expanded position.

17. The method of claim 12, wherein the expandable element comprises an inflatable bladder, and actuating the expandable element of the flow control device comprises inflating the inflatable bladder of the flow control device within the conduit.

18. The method of claim 12, further comprising:

sensing, with at least one sensor, a characteristic of the fluid in the flow path; and receiving, at a communication system, a signal from the at least one sensor;

wherein the actuating of the expandable element occurs based on the received signal from the at least one sensor.

19. A flow control device, comprising:

an inflatable bladder connected to an interior surface of a conduit and disposed along the interior surface of the conduit for a first length, the inflatable bladder configured to expand inwardly from the interior surface from a first, retracted position to a second, expanded position, and an inner surface of the inflatable bladder defining at least a portion of a flowpath configured to guide a fluid through the conduit, wherein the inner surface is cylindrical along the first length in the second, expanded position of the inflatable bladder.

20. The flow control device of claim 19, wherein the inflatable bladder comprises a hollow cylindrical shape, and the inner surface of the inflatable bladder defines the flowpath having a circular flow area along the inner surface of the inflatable bladder.

* * * * *